(12) United States Patent
Ohara

(10) Patent No.: US 8,006,730 B2
(45) Date of Patent: Aug. 30, 2011

(54) PNEUMATIC TIRE WITH TREAD HAVING CIRCUMFERENTIAL MAIN GROOVES

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 912 days.

(21) Appl. No.: 11/874,334

(22) Filed: Oct. 18, 2007

(65) Prior Publication Data

US 2008/0121326 A1  May 29, 2008

(30) Foreign Application Priority Data

Nov. 24, 2006  (JP) .................................. 2006-316848

(51) Int. Cl.
  *B60C 11/04* (2006.01)
  *B60C 11/12* (2006.01)
  *B60C 11/13* (2006.01)

(52) U.S. Cl. ......... 152/209.19; 152/209.21; 152/209.24; 152/DIG. 1; 152/DIG. 3; 152/901

(58) Field of Classification Search .............. 152/209.18, 152/209.21, 209.24, DIG. 3, 900, 901, 209.19, 152/209.23, DIG. 1
See application file for complete search history.

(56) References Cited

U.S. PATENT DOCUMENTS

| 5,535,798 A | * | 7/1996 | Nakamura | 152/209.21 |
| 6,196,288 B1 | * | 3/2001 | Radulescu et al. | 152/DIG. 3 |

FOREIGN PATENT DOCUMENTS

| CA | 2018565 | * | 12/1990 |
| JP | 01-215603 | * | 8/1989 |
| JP | 02-212203 | | 8/1990 |
| JP | 06-048123 | * | 2/1994 |
| JP | 2000-185525 | | 7/2000 |
| JP | 2001-055013 | | 2/2001 |

OTHER PUBLICATIONS

Machine translation for Japan 06-048123 (no date).*

* cited by examiner

*Primary Examiner* — Steven D Maki
(74) *Attorney, Agent, or Firm* — Fish & Richardson P.C.

(57) ABSTRACT

A pneumatic tire of the invention includes: a stepped-shaped raised area provided in the main groove positioned at a center area of the tire so as to be continued circumferentially of the tire, connected to either the main groove walls, and raised from the groove bottom; and a ridge lower than a tread surface of the tire in each of the main grooves on both outsides of the main groove at the center area of the tire so as to be raised from the center of the groove bottom continuously along the length thereof without being joined with the groove walls, and the angle of inclination of the main groove walls with respect to the normal line of the tangential line on the tread surface of the main groove portion is parallel to each other or is 5° or smaller.

5 Claims, 4 Drawing Sheets

PNEUMATIC TIRE WITH TREAD HAVING CIRCUMFERENTIAL MAIN GROOVES

BACKGROUND OF THE INVENTION

1. Field of the Invention

The present invention relates to a pneumatic tire having a rib pattern including a plurality of land portions continuing substantially circumferentially of the tire and, more specifically, to a pneumatic tire having a rib pattern which improves wear resistance, improves stone-nipping resistance, prevents generation of cracks on the groove bottom, and secures braking property and driving property when having worn.

2. Description of the Related Art

Uneven wear of a pneumatic tire having a rib pattern mainly includes step wear starting from grounded ends in the direction of axis of rotation of the tire and river wear generating at rib ends on both sides of a main groove, and there is a problem in the related art that particularly the river wear which is uneven wear occurring locally in the circumferential direction at the rib ends tends to occur.

An effective countermeasure for the step wear is to prevent the uneven wear by providing circumferential narrow grooves in the vicinity of the grounded ends of the shoulders of a tread surface. Also, in order to cope with the river wear, a technology to form a number of short sipes arranged along the rib ends circumferentially of the tire so as to extend widthwisely of the tire and open at one end into the main groove is known.

On the other hand, the rib pattern has a problem that it tends to nip stones in the groove, and the nipped stone is firmly held in the groove and cannot come out easily. In order to prevent the stone-nipping in the circumferential groove, JP-A-2000-185525 and JP-A-2001-55013 propose provision of a plurality of narrow ridges or projections having a circumferential length of 5 to 100 mm, at regular intervals of 0.5 to 20 mm on the bottom surface of the circumferential grooves on the tire tread portion.

As a tire which achieves both water drainage property and noise resistance of the tire, JP-A-2-212203 discloses a tire having a rib pattern including a groove top having a step extending circumferentially of the tire substantially in parallel to the tread surface at a level of a predetermined depth from the tread surface and a groove bottom formed radially inwardly from the groove top, in which the groove bottom is serpentined circumferentially of the tire.

The linear main groove of the rib pattern generally formed into a V-shape in cross-section for preventing the stone-nipping, and hence the proximal portion of the rib is smaller in width in comparison with a ground contact surface. Therefore, when the rib comes into contact with the ground, the rib is deformed by vertical force on load and groove walls are bulged toward the center of the groove, the groove walls tend to bulge on the side of the ground contact surface having a smaller width in comparison with the groove bottom, and hence the uneven wear can easily occur due to the movement of rubber.

The tire attached to a steering wheel is subject to a relative slippage with respect to the road surface on the sides of the ground contact ends of the shoulders which are relatively smaller in diameter in relation to the curvature of the surface of the ground contact surface of the tire. Therefore, uneven wear tends to occur on the shoulder sides in comparison with the center side.

The rib pattern has the problem of the above-described stone-nipping, and also a problem in the braking property and the driving property on the wet road surface. Therefore, even when the short sipes are provided as described above, there remains a problem of lowering of the braking property on the wet road on and after the medium phase of wear.

BRIEF SUMMARY OF THE INVENTION

In view of the problems described above, it is an object of the invention to provide a rib-patterned pneumatic tire in which uneven wear resistance is improved by reducing movement of rubber on a ground contact surface of a rib by restraining groove walls of a rib from bulging on load, stone-nipping resistance is improved, generation of cracks on the groove bottom is prevented and, in addition, braking property and driving property after having worn are secured.

In order to solve the above-described problems, an aspect of the invention is a pneumatic tire having a plurality of linear main grooves continuing circumferentially of the tire and a plurality of linear ribs formed by being partitioned by the main grooves on a tread thereof, including: a raised area provided in the main groove positioned at a center area of the tire so as to continue circumferentially of the tire, the raised areas being joined to either the groove walls of the main groove and being raised from the groove bottom to form a stepped shape; a ridge lower than a tread surface of the tire is provided in each of the main grooves positioned on both outsides of the main groove at the center area of the tire so as to be raised from the center portion of the groove bottom continuously along the length thereof without being joined with the groove walls, wherein the angle of inclination of the groove walls of the main grooves with respect to the normal line of the tangential line drawn on the tread surface of the main groove portion is parallel to each other or is 5° or smaller in the direction to reduce the width of the grooves of the main grooves on the radially inside of the tire.

According to the pneumatic tire of the invention configured as described above, with the provision of the stepped-shaped raised area on at least on one of the groove walls of the main groove positioned at the center area of the tire (referred also to as the tire center side) in the circumferential direction, the rigidity of the ribs is secured without increasing the width of the ribs formed by the main grooves so that the wear resistance is improved and stone-nipping is prevented by the raised portion, so that the stone-nipping resistance is improved. With the provision of the zigzag shape including the repetitive peaks and troughs circumferentially on the wall portion of the raised area, the proximal portion of the rib is removed, and hence the rigidity thereof is lowered relatively with respect to the rib surface, so that deformation of the groove wall on the surface side is restrained. In addition, the zigzag shape appears when having worn, and the braking property and the driving property may be secured on and after the medium phase of wear so that the control stability is maintained.

The main groove positioned on both outsides (referred also to as the shoulder sides) of the main groove positioned at the center area of the tire are each adapted in such a manner that when the thickness of rubber at the bottom portion of the main groove is thinner than that of the rib portion, and when the belt ply on the outermost layer is arranged inside the shoulder-side main grooves, the groove walls of the rib is deformed to bulge as if they are convoluted toward the center side with the groove bottoms as fulcrums and the tread surface is moved when it comes into contact with the ground. Therefore, by enhancing the rigidity of the groove bottom with the ridge provided at the center portion of the groove, the stress caused by the deformation can be absorbed. In contrast to the V-shaped main groove in the related art in which the angle of inclination of the groove walls exceeds 10°, the angles of inclinations of the groove walls of the main groove with respect to the normal lines of the tread surface at the portion where the main groove exists are set to be parallel to each other or to be 5° or smaller in the direction to reduce the width of the grooves of the main grooves on the radially inside of the tire, so that the ground contact pressure of the rib ends is lowered and hence deterioration of wear resistance due to the deformation is restrained. The normal line of the tread surface of the main groove portion represents the normal line with respect to the tangential line with respect to the ends of the main groove of a standard rim prescribed by the TRA (the Tire and Rim Association) with prescribed air pressure/no load state.

The ridge restrains the stone-nipping into the main groove, and restrains shear deformation of the groove wall of the rib on the grounded ends toward the center of the tire due to a lateral force applied thereto when a vehicle is turned. Therefore, the ridge is disposed independently from the groove walls on both sides so as not to impair the deformation of the rib ends.

With the provision of the zigzag notches formed into a triangular pyramid shape directed toward the groove bottom on one of the groove walls of the main groove positioned at the center area of the tire circumferentially of the tire at regular intervals, the rigidity of the proximal portion of the rib is reduced to cause the bulging of the groove wall surface on load to move toward the groove bottom and reduce the extent of movement of the rubber at the rib ends on the ground contact surface, that is, the widthwise movement at the rib ends, so that the uneven wear resistance is improved. In addition, the zigzag shape appears on the tread surface in association with the progress of wear, so that the braking property and driving property on the wet road are also secured.

Furthermore, with the arrangement of the peaks and the troughs of the wall portion of the raised area and of the triangular pyramid shapes at the same intervals in such a manner that the peaks and the troughs of them are arranged so as to oppose to each other in pairs with the intermediary of the main groove, the width of the groove bottom is secured and hence water drainage property is secured, and the radius of curvature (R) for joining the groove bottom and the groove wall continuously is set to be a relatively large value, so that generation of cracks on the groove bottom may be restrained.

DETAILED DESCRIPTION OF THE INVENTION

Figure 1:
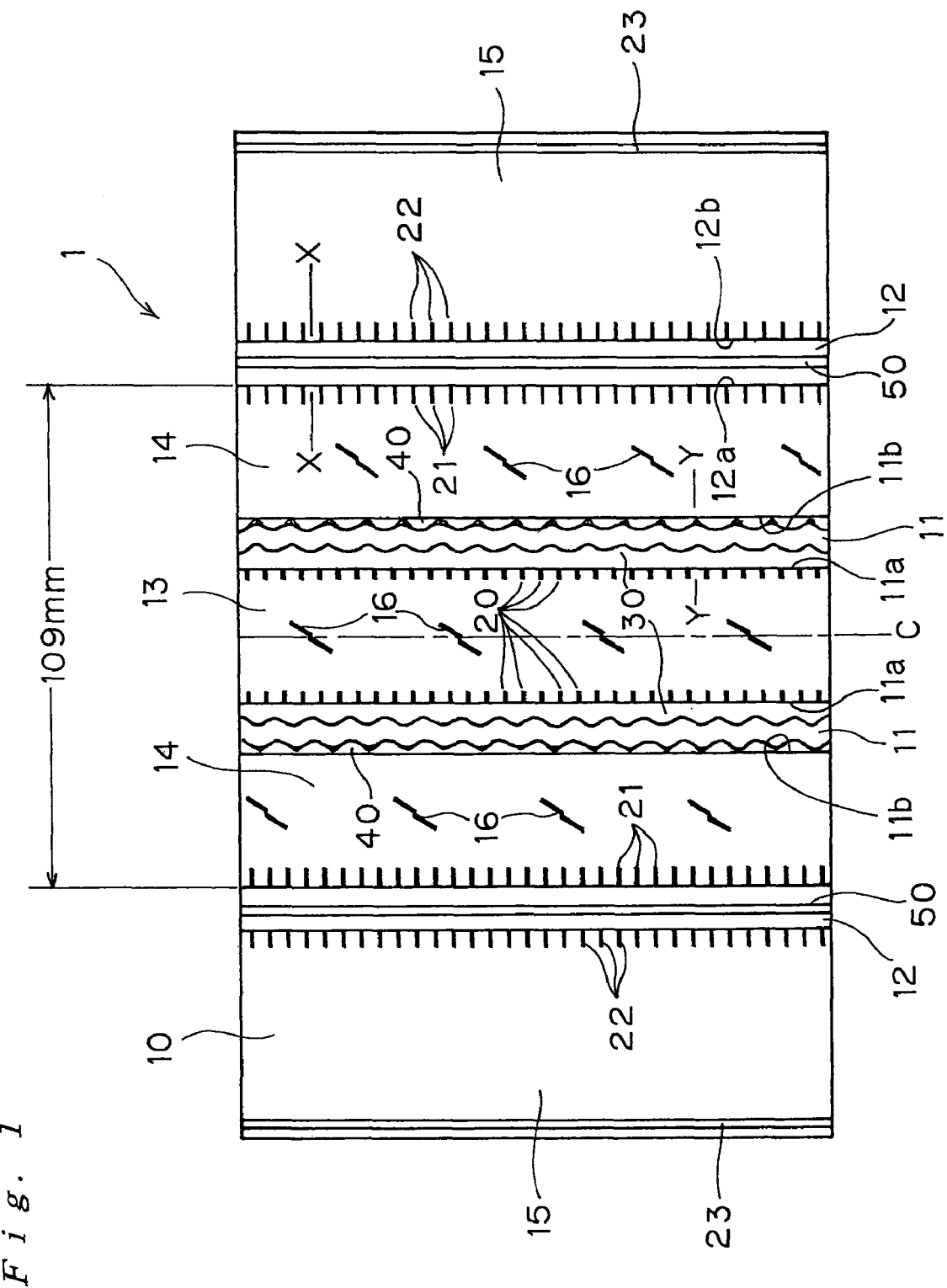
FIG. 1 is an expansion plan view of a tread pattern according to an embodiment.

Referring now to the drawings, an embodiment of the invention will be described. In this embodiment, a large-sized tire for heavy-load use for trucks and buses will be described. However, the invention is not limited to the embodiment shown here.

Figure 2:
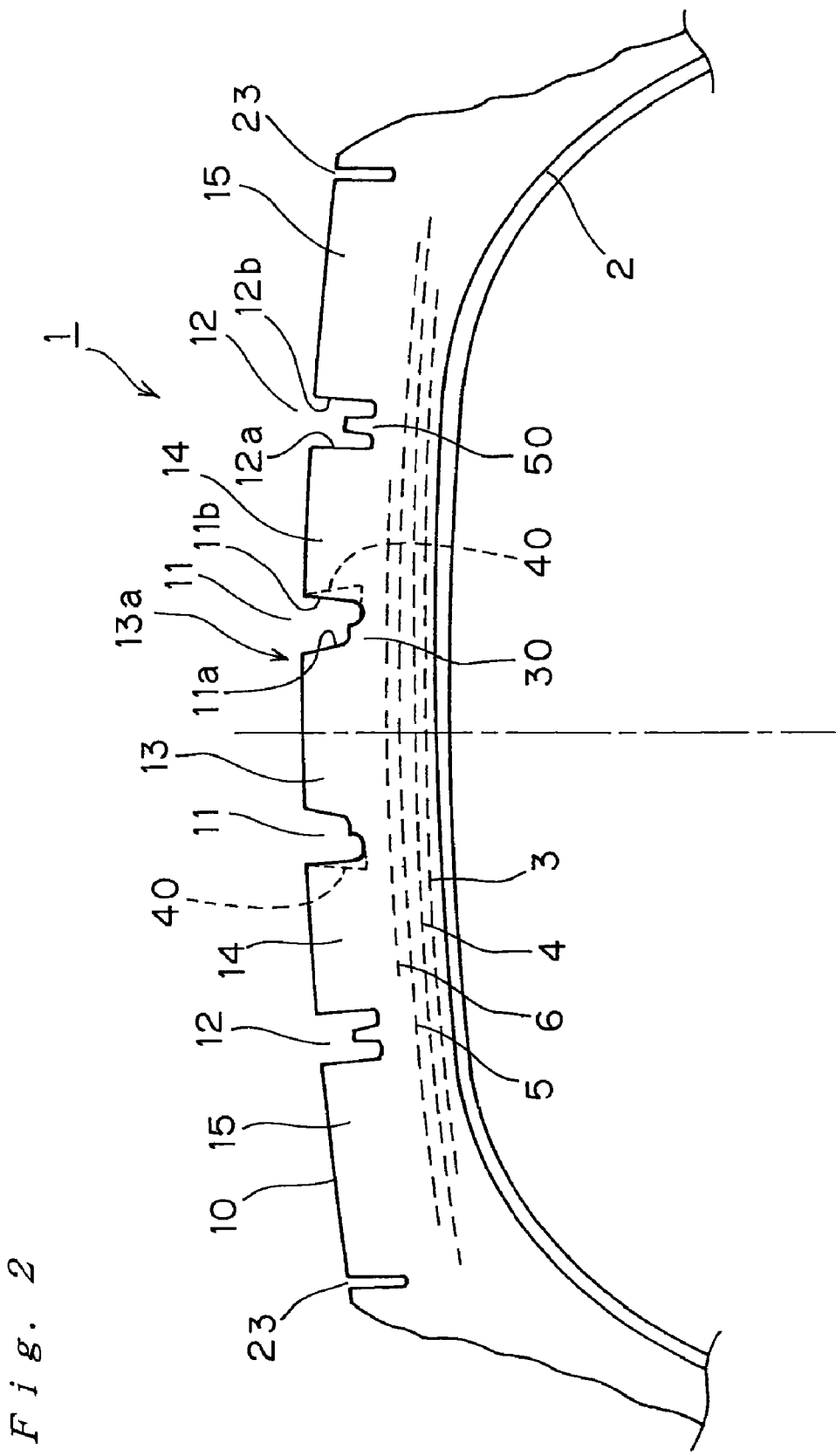
FIG. 2 is a widthwise cross section of the tread.

FIG. 1 is an expansion plan view of a tread pattern of a pneumatic tire 1 of a size of 295/75R22.5 (hereinafter, it may be referred simply to as "tire") according to an embodiment of the invention. FIG. 2 is a widthwise cross section of the tread.

As shown in FIG. 2, the tire 1 is a pneumatic radial tire having a general internal structure including a radial carcass 2 formed of a steel cord ply engaged with bead cores of a pair of bead portions, a belt including four steel code plies 3, 4, 5, and 6 arranged radially outside thereof, a tread 10 surrounding the outer periphery of the belt, and side walls continuing from the tread 10, and detailed description thereof will be omitted.

In the drawing, the tread 10 is partitioned by four main grooves 11 and 12 continuing linearly along the circumference direction, a center rib 13 defined by the two main grooves 11 and 11 and positioned on an equator line C at the center of the tread, intermediate ribs 14 and 14 positioned on both outsides of the center rib 13, and shoulder ribs 15 and 15 positioned both outsides of the intermediate ribs 14, and the respective ribs 13, 14, and 15 define linear land portions continuing circumferentially of the tire. Generally, the plurality of ribs 13, 14, and 15 are provided in symmetry with respect to the equator line C of the tire.

The center rib 13 and the intermediate ribs 14 are each provided with closed sipes 16 along the widthwise center thereof, and the shoulder ribs 15 at both sides are each formed with a narrow groove 23 extending circumferentially at a position near the outer edge thereof.

The pair of main grooves 11 positioned at the center area of the tire 1 of the invention each are formed with a raised area 30 which continues to a groove wall 11a of the main groove 11 on the center-side of the tire and raised from the groove bottom into a stepped shape so as to continue circumferentially of the tire.

The raised areas 30 preferably have a depth of 0.2 to 0.6 times the depth of the main groove 11, and more preferably, less than 0.5 times. When the height of the raised area 30 is lower than 0.2 times, the change in shape of the groove in cross-section due to the compressed deformation of the rib cannot be reduced sufficiently, the problem of stone-nipping during travel tends to occur, and the nipped stone can hardly come out. The problem of the stone-nipping tends to occur also when the height of the raised area 30 exceeds 0.6 times.

Figure 6:
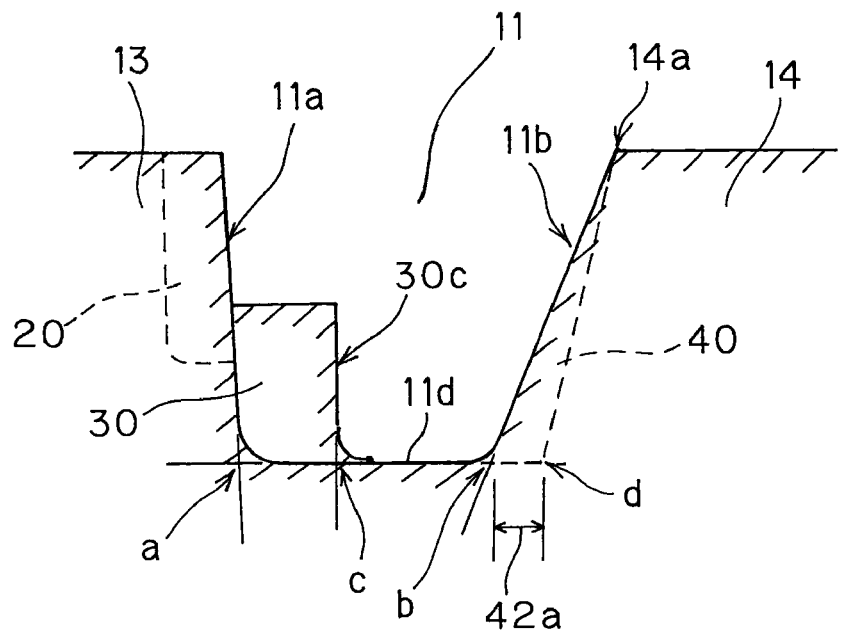
FIG. 6 is a cross-sectional view taken along the line Y-Y in FIG. 1.

As shown in FIG. 6, the width (a-c) of the bottom portion of the raised area 30 is preferably 0.2 to 0.6 times, and more specifically, 0.3 to 0.5 times the groove bottom width (a-b) of the main groove 11, where a designates the intersection between an extension of the groove wall 11a of the main groove 11 and a groove bottom surface 11d, b designates the intersection between an extension of a groove wall 11b and the groove bottom 11d, and c designates the intersection between an extension of a wall portion 30c of the raised area 30 and the groove bottom 11d. When the width (a-c) of the bottom portion is smaller than 0.2 times, the change in shape of the groove in cross section due to the compressed deformation of the rib cannot be reduced sufficiently, and when the width exceeds 0.6 times, an R at a connection between the groove bottom 11d and the groove wall 11b of the main groove 11 can hardly be secured, so that cracks are generated easily on the groove bottom.

When the raised area 30 for joining the groove wall 11a is not provided, a rib end 13a of the rib 13 protrudes largely to the main groove 11 side. In contrast, with the provision of the raised area 30, the groove wall of the rib 13, that is, the protrusion of the groove wall of the rib 13, in particular, the portion near the ground contact portion is reduced. Therefore, the change in shape of the groove in cross-section due to the compressed deformation of the rib 13 is reduced, and hence the movement of the rib end can be restrained correspondingly, so that the local wear of the rib ends is reduced, and occurrence of uneven wear such as river wear may be reduced.

Figure 3:
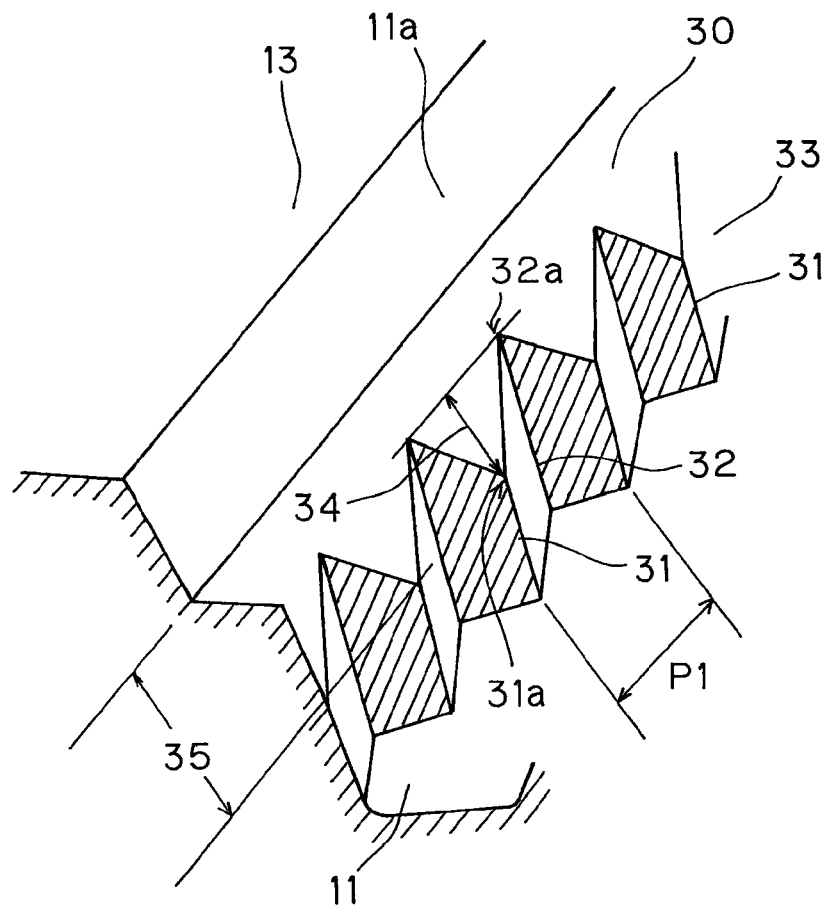
FIG. 3 is a perspective view showing a raised area of a center-side main groove.

In the configuration above, as shown in a perspective view in FIG. 3 showing the raised area, the raised area 30 preferably has a zigzag wall portion 33 including repetitive peaks 31 and troughs 32 circumferentially of the tire.

When the wall portion 33 of the raised area 30 is a linear shape, there are problems in braking property, driving property when traveling on the wet road, particularly a problem of lowering of the braking property when having worn. This problem may be coped with by arranging a number of short sipes at rib ends opening widthwisely of the tire at short intervals circumferentially of the tire until the medium phase of wear. However, when the lateral grooves or short sipes provided on the ribs are disappeared and the cross sectional area of the main grooves is reduced in association of progress of the wear of the tire, the water drainage effect for draining water from the road surface when traveling on the wet road is lowered, and hence the water film break down effect between the tread surface and the road surface which was provided at the beginning is lowered, so that the braking property, the driving property, or control stability against side slippage is abruptly lowered.

In order to solve this problem, the zigzag wall portions 33 including the repetitive peaks 31 and troughs 32 circumferentially of the tire are formed on the raised areas 30, so that the zigzag shape appears in association with wear for securing the braking property and the driving property. This zigzag further demonstrates followability with respect to circumferential slippage, and hence the uneven wear preventing effect can further be improved. It is not preferable to form the entire part of the groove walls 11a and 11b of the main grooves 11 into the zigzag shape because the uneven wear occurs easily from the early stage starting from the apexes of the peaks. The peaks 31 and the troughs 32 are preferably repeated at regular intervals.

The width 34 between apexes 31a of the peaks 31 and bottoms 32a of the troughs 32 of the zigzag wall portion 33 is preferably in a range between 20 and 50% of the entire width 35 of the raised area 30, although it is not specifically limited to this range. When the width 34 is less than 20%, the depth of the zigzag is small and hence the braking and driving effect provided by the zigzag wall portion 33 when having worn is insufficient. In contrast, when it exceeds 50%, the difference in rigidity between the peaks 31 and the troughs 32 is large, which easily cause the uneven wear.

The pitch P1 between the peak 31 and the peak 31 is preferably set to a range from 50 to 200% of the width of the raised area, although it is not limited thereto. When it is less than 50%, the peak portions of the zigzag shape are too flexible, so that the pressure sufficient for obtaining a frictional force cannot be obtained, which easily cause the uneven wear. In contrast, when it exceeds 200%, the edge effect which breaks down water film on a ground contact surface is reduced, so that the braking and driving properties cannot be demonstrated sufficiently when having worn.

Figure 4:
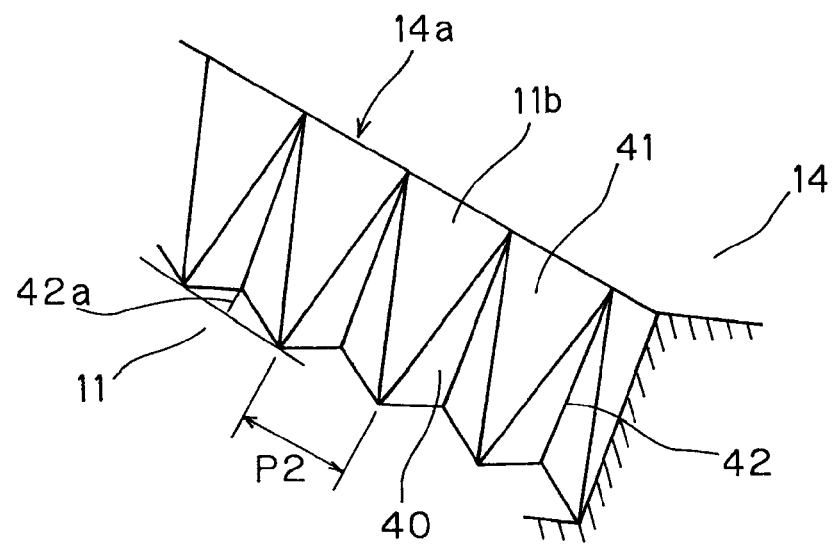
FIG. 4 is a perspective view showing notches in the shape of a triangular pyramid of the center-side main groove.

The shoulder-side groove walls 11b of the main grooves 11 may be formed with zigzag notches 40 in the shape of a triangular pyramid in FIG. 4 extending toward the groove bottom as shown in the perspective view which illustrates the triangular-pyramid-shaped notches circumferentially of the tire.

As shown in FIG. 4, the notches 40 are increased in width and depth as they approach the groove bottom of the main groove 11, whereby the zigzag shape including the repetitive peaks 41 and troughs 42 of the triangular pyramid shape is formed on each of the groove walls 11b. The notches 40 may be formed in such a manner that the apexes of the triangular pyramids match a rib end 14a as shown in FIG. 4, or may be formed in such a manner that they extend from the midpoint of the groove wall 11b toward the groove bottoms.

The dimensions of the notches 40 are preferably such that the pitch P2 of the groove bottoms of the notches 40 is 30 to 100% of the depth of the main groove 11, although it is not limited specifically. When it exceeds 100%, since the peaks 41 of the zigzag are liable to be deformed in comparison with the troughs 42, rubber moves easily toward the peaks 41. In other words, since the extent of movement of the peaks 41 with respect to the width of the tire is significantly large, slippage is accelerated and hence it is easily worn, so that the uneven wear starts from here. When it is less than 30%, since the rigidity and the strength of the peaks 41 are lowered, cracking or break-down of rubber can easily occur, and the braking effect is lowered. The zigzag peaks 41 and the troughs 42 are preferably formed at regular intervals.

The depth 42a of the trough 42 (b-d in FIG. 6) is preferably in the range from 10 to 30% of the groove width (a-b in FIG. 6), although it is not specifically limited. When the depth 42a is less than 10%, the width of the zigzag is small, and hence the braking and driving effect provided by the zigzag wall portion when having worn is insufficient. In contrast, when it exceeds 30%, the difference in rigidity between the peaks 41 and the troughs 42 is large, which easily cause the uneven wear.

When the zigzag wall portions 33 on the raised areas 30 and the zigzag notches 40 in the shape of the triangular pyramid shape on the shoulder-side groove walls are formed simultaneously on both sides of the main grooves 11, it is preferable that the peaks 31 and the troughs 42 opposing with the intermediary of the main groove 11 are opposed to each other in pairs.

It is because when the peaks 31 and the troughs 42 are arranged in pairs, the depression and projection of the zigzag shapes lie in substantially parallel to each other, so that the variation in groove width is minimized, and local narrowing of the groove width is avoided, so that the water drainage property when traveling on the wet road is secured, and a multiplier effect, that is, improvement of the braking property and driving property owing to the friction effect and the water drainage property provided by the zigzag shape is achieved. In addition, since the R for connecting the groove bottom with the raised area 30 and the notch 40 may be set to a relatively large value, so that the cracks on the groove bottom may be advantageously reduced.

When the groove width and the R on the groove bottom portion are secured even when the peaks 31 of the raised areas 30 and the peaks 41 of the notches 40 are opposed to each other, the peaks 31 and the peaks 41 may be opposed to each other. It is because the width of the main groove differs depending on the tire size, and hence there is no significant difference in the braking and driving properties and crack resistance as long as the groove width is the same even when the peaks 31 and the peaks 41 are opposed to each other.

The tire 1 according to the invention is provided with ridges 50 lower than the tread surface of the tire in the pair of main grooves 12 positioned on the shoulder sides so as to be raised continuously along the length of the groove at the center of the groove bottom without being joined with groove walls 12a and 12b.

The main grooves 12 are each adapted to prevent the stone-nipping effectively by forming the groove walls 12a and 12b on both sides so as to be parallel to each other or inclined in the direction in which the width of the main groove is narrowed and, in addition, providing the ridge 50 at the center of the groove in comparison with the groove having V-shape in cross section, which is widely used against the stone-nipping problem in the related art, so that stones can hardly enter into the groove and if entered once, it can easily come out from the groove by being pushed by the ridge 50.

Figure 5:
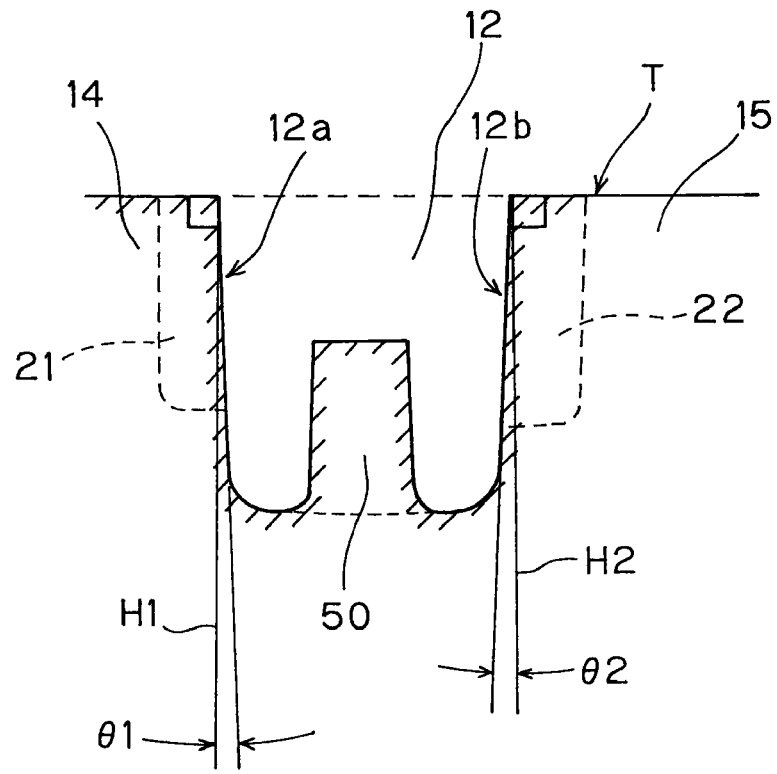
FIG. 5 is a cross-sectional view taken along the line X-X in FIG. 1.

The main grooves 12 on the shoulder sides are each adapted in such a manner that when the thickness of rubber at the main groove bottom portion is thinner than that of the rib portion and when a belt ply 6 on the outermost layer is arranged inside the shoulder-side main grooves 12, the groove walls of the rib 14 is deformed to bulge as if they are convoluted toward the center side with the groove bottom as fulcrums and the tread surface is moved when it comes into contact with the ground. Therefore, in order to absorb the stress caused by the deformation, which could not be absorbed due to the resistance against the deformation of the groove wall in the V-shaped groove in the related art, as shown in FIG. 5, the angles of inclinations $\theta 1$ and $\theta 2$ of the linear groove walls 12a and 12b of the main groove 12 with respect to normal lines H1 and H2 of a tangential line T with respect to the tread surface at the groove ends of the main groove 12 are set to be parallel to each other or to be 5° or smaller in the direction to reduce the width of the grooves of the main grooves 12 on the radially inside of the tire, so that the stress is absorbed to reduce the change in shape of the groove walls 12a and 12b, whereby the uneven wear resistance of the rib ends are improved.

Since the ridge 50 restrains deformation of the shoulder ribs 15 toward the center side of the tire due to a lateral force applied thereto when a vehicle is turned, it needs to be disposed independently from the groove walls 12a and 12b so as not to impair the deformation of the rib ends.

The height of the raised portion of the ridge 50 is preferably 0.3 to 0.7 times and, more preferably, less than 0.6 times the depth of the main groove 12. When the height is smaller than 0.3 times, the stone-nipping preventing effect is insufficient, and the rigidity of the groove bottom is also insufficient so that deformation of the groove walls of the rib to bulge as if they are convoluted toward the center side with the groove bottom as a fulcrum cannot be restrained, and hence the bulged groove walls 12a and 12b come into contact with the ridge 50, so that the effect to restrain deformation is not obtained. When the height exceeds 0.7 times, relatively small stones in diameter are easily nipped, and the nipped stones cannot come out easily.

The width of the bottom portion of the ridge 50 is preferably 0.3 to 0.6 times and, more preferably, 0.4 to 0.5 times the width of the groove bottom of the main groove 12. When it is smaller than 0.3 times the width of the bottom portion, the rigidity of the ridge is low, and hence the effect to push the stone upward cannot be obtained easily, and when the width exceeds 0.6 times, it is difficult to secure the R of the groove bottom of the main groove 12 so that the cracks are easily generated on the groove bottom.

The tire 1 according to the invention is preferably configured in such a manner that the height of the raised areas 30 raised in the main grooves 11 on the center side is set to be lower than the height of the ridges 50 raised in the main grooves 12 on the shoulder sides. Accordingly, even in the area where a high ground contact pressure is applied and hence the speed of wearing is high, the raised areas 30 are not exposed to the tread surface in an early stage, and the initial performance is maintained.

The belt used in the tire 1 normally includes steel cords of 3×0.20+6×0.35 or 3+9+15×0.22(+1). The belt used as the outermost layer may be a so-called high-elongation cord with high elongation property, such as 4×2×0.23 or 1×5×0.35, which is superior in cut resistance against the external damage of the tread. These belt cords are arranged at an angle in the range from 15 to 35° with respect to the equator line C (the first belt might be used at an angle in the range from 50 to 65°) and, as shown in FIG. 2, is formed of a belt ply including three or more layers (four layers in FIG. 2).

According to the tire 1 in the invention, the outermost belt 6 is preferably arranged on the tire center side with respect to the main grooves 12 on the shoulder side. Accordingly, radially outward growing of the tire is restrained by the belt 6 provided in the center area of the tire, so that the difference in diameter from the shoulder ribs 15 is reduced and hence the lowering of ground contact property of the shoulder ribs 15 may be restrained. Since this belt is not arranged in the shoulder portions, the followability to the road surface when in contact with the ground is enhanced so that wear of the shoulder ribs 15 is prevented from being accelerated.

Furthermore, in the tire 1, the short sipes 20, 21, and 22 openings along the ridge lines of the ribs are preferably distributed at intervals of 6 mm or smaller circumferentially of the tire, so that the braking property on the wet road is improved, and even when the slippage due to shear force is generated at the rib ends when in contact with the ground, the followability to the slipping force is improved, so that the slippage is avoided and the uneven wear of the rib ends is prevented. When the interval of the short sipes exceeds 6 mm, the above-described followability can hardly be obtained, whereby the effect to prevent the uneven wear is lowered.

The dimensions of the short sipes 20, 21, and 22 are preferably approximately 0.5 to 1.0 mm in width, 2 to 5 mm in opening length on the rib surface, and 5 to 10 mm in depth although they are not specifically limited. When the dimensions of the sipes are small, they cannot demonstrate their effects, and when they are too large, cracks are generated at the ends of the sipes due to input from the road surface, which causes problems such as lowering of the uneven wear resistance or deterioration of appearance quality.

In the pneumatic tire 1 as described above, the real rib widths, which are widths obtained by excluding areas where the short sipes 20, 21, and 22 are provided from the rib width respectively and practically contribute to the wear resistance, of the center rib 13, the intermediate ribs 14, and the shoulder ribs 15 are preferably set to be in the range from 95 to 105 for the real rib width of the intermediate ribs 14 on both sides of the center rib 13 and in the range from 140 to 160 for the real rib width of the shoulder ribs 15, assuming that the real rib width of the center rib 13 is 100. Accordingly, the rigidity of the shoulder ribs 15 is enhanced to restrain the deformation thereof, the ground contact pressure of the shoulder ribs 15 is uniformized to prevent progress of the uneven wear from the outsides, and generation of chipping of the ribs due to getting on and off a curbstone or the like and generation of cracks from the bottom of the narrow groove are effectively prevented.

In the example shown in FIG. 1, the center rib 13 and the intermediate ribs 14 are provided with the closed sipes 16 in the form of the flash of lightening having terminals in the corresponding rib area on the widthwise center portion of the rib at intervals circumferentially of the tire. The closed sipes 16 contribute to absorb compressed deformation of the ribs, and secure the rigidity of the rib end and limits the movement thereof, so that the wear resistance is improved.

It is also possible to provide the open sipes opening at the rib ends on the circumferentially of the ribs instead of the closed sipes 16, or both the closed sipes and the open sipes may be provided. In other words, the tire 1 may have a tread pattern partly include a block as long as it has ribs which continue circumferentially of the tire. The sipes may be arranged also on the shoulder ribs 15 as a matter of course. Various sipe shapes such as linear shape, wave shape, or zigzag shape may be employed.

The tire 1 is provided with a single narrow groove 23 extending circumferentially at a position near the outer edge of the shoulder rib 15 on both sides. By forming the narrow groove 23 and preferably setting the depth of the narrow groove 23 deeper than the main groove 12, it takes on the deformation of the rib portion outside the narrow groove 23 due to the lowering of its rigidity to be worn in advance, and hence progress of the uneven wear to the shoulder rib 15 is restrained.

EXAMPLE

Referring now to an example, the invention will be described in detail.

A prototype tire having the tread pattern shown in FIG. 1 including the raised areas 30 in the pair of main grooves 11 on the center side, the triangular-pyramid-shaped notches 40, and the ridges 50 in the main grooves 12 on the both shoulder sides set as shown in the table shown below was manufactured and the performance of the tire was evaluated. The dimensions of the raised area or the like were as shown below. In the table, a letter G indicates that the value is set, and lateral bars indicate that the value is not set.

The main grooves 11 and 12 of the prototype tire both had a width on the tread surface of 11 mm, a depth of 12 mm. The height of the raised areas 30 was 4 mm, the width of the upper surface of the stepped portion was 3 mm, the depth from the pitches to the troughs of the zigzag wall portion was 1.8 mm, and the trough-to-trough pitches were 8 mm. The triangular-pyramid-shaped notches 40 were formed from the rib end as shown in FIG. 4, the depth of the troughs was set to 2.6 mm, and the trough-to-trough pitches were set to 8 mm. The height of the ridge 50 was formed into a trapezoidal shape in cross section having a height of 6 mm, a bottom width of 4 mm, and an upper width of 3 mm. These values were common for the respective tires. The groove wall inclination angle θ of the main grooves 12 on the shoulder side was set to be the same angle on the center side and the shoulder side.

The tires was the radial tires having the size of 295/75R22.5, and a steel cord of 3+8×0.22 mm was used for the carcass ply, steel cords of 3×0.20+6×0.35 mm were used for the first to third belt plies, and a steel cord of 1×5×0.35 mm (high elongation) was used for the outermost layer belt. The width of the outermost layer belt was 96 mm and the belt ends were arranged inside the shoulder ribs 14 on the center side (the width of the shoulder rib 14 between the both rib ends is 109 mm).

The short sipe 20 was 0.7 mm in width, 3 mm in opening length on the rib, and 7 mm in depth. The short sipes 21 and 22 have a width of 0.7 mm, 5 mm in opening length on the rib, 7 mm in depth. The inter-sipes interval was 5 mm for both sipes.

(Uneven Wear Resistance)

The tire of the invention was mounted to a front wheel (steering wheel) of a tractor (2-D) of a long-distance trailer and the surface area where the river wear was occurred after having traveled a distance of 160000 km was measured and expressed by an index with the related art as the standard with an index of 100. The smaller the value is better.

(Stone-Nipping Resistance)

The number of stone-nipping in the groove was visually confirmed after having terminated the uneven wear resistance test, and the confirmed number of stones was expressed by an index with the related art as the standard with an index of 100. The smaller the value is better (Groove Bottom Cracking Resistance)

After having terminated the uneven wear resistance test, presence or absence of occurrence of cracks on the groove bottom was visually evaluated with the state of occurrence in the related art as the standard. When the number of occurrence is smaller and the growth of cracks is small in comparison with the related art, it is marked with a VG; when the result is equivalent to the related art, it is marked with G; when the result is inferior to the related art, it is marked with NG; and when it is significantly inferior to the related art, it is marked with VB.

(Braking Property on Wet Road)

A tire after having worn by 60% was mounted to the front wheel (steering wheel) of the tractor (2-D), and the braking distance obtained when traveling on the asphalt wet road with a water depth of 3 mm and braking to a full extent from a speed of 60 km/h was measured and expressed by an index with the related art as the standard with an index of 100. The smaller value is better.

TABLE 1

|  | Related Art | Comparative Example | | | | Example | | | |
| --- | --- | --- | --- | --- | --- | --- | --- | --- | --- |
|  |  | 1 | 2 | 3 | 4 | 1 | 2 | 3 | 4 |
| raised area in center-side main groove | — | G | — | G | G | G | G | G | G |
| zigzag groove wall in center-side main groove | — | — | — | G | G | — | G | G | — |
| triangular-pyramid-shaped notches in center-side main groove | — | — | — | G | G | — | — | G | G |
| ridge in shoulder-side main groove | — | — | G | — | G | G | G | G | G |
| angle of inclination θ(°) in shoulder-side main groove | 12 | 4 | 4 | 4 | 12 | 4 | 4 | 4 | 4 |
| uneven wear resistance (index) | 100 | 92 | 85 | 88 | 107 | 80 | 82 | 78 | 83 |
| stone-nipping resistance (index) | 100 | 130 | 102 | 118 | 68 | 98 | 95 | 97 | 96 |
| groove bottom cracking resistance | G | G | G | G | VB | G | G | G | G |
| braking property on wet road (index) | 100 | 89 | 78 | 83 | 145 | 93 | 91 | 88 | 85 |

According to table 1, with the tire in the example of the invention, occurrence of the river wear was restrained, the uneven wear resistance was improved, the stone-nipping resistance was improved, and occurrence of cracks on the groove bottom was restrained. In addition, it was found that the braking property on the wet road on and after the medium phase of wear was secured.

The uneven wear resistance was improved, in particular, by reducing the angle of inclination of the groove walls of the shoulder-side main grooves to a range within 5°, and the breaking property on the wet road is also improved by securing the cross sectional area of the groove. However, it causes lowering of the stone-nipping resistance. It was found that arrangement of ridge was effective in order to improve the stone-nipping resistance while keeping the predominance in the uneven wear resistance and the braking property on the wet road obtained by reduction of the angle of inclination of the groove wall.

According to the pneumatic tire in the invention, the wear resistance is improved, the stone-nipping resistance and prevention of cracks on the groove bottom are improved, and the braking property and driving property when having worn are secured and hence the control stability is improved.

The pneumatic tire according to the invention may be applied to tires of various sizes and various usages from the tire for passenger cars to a large-sized tire for heavy-load use for trucks and buses without discriminating between the steering wheel and the driving wheel. However, the invention is specifically preferably for the front wheel (steering wheel) of large vehicles such as trucks, busses, and tractors.

What is claimed is:

1. A pneumatic tire having a plurality of linear main grooves continuing circumferentially of the tire and a plurality of linear ribs formed by being partitioned by the main grooves on a tread thereof, comprising:
   a raised area being provided in the main groove positioned at a center area of the tire so as to continue circumferentially of the tire, the raised area being joined to either of the groove walls of the main groove and being raised from the groove bottom to form a stepped shape; and
   a ridge lower than a tread surface of the tire being provided in each of the main grooves positioned on both outsides of the main groove at the center area of the tire so as to be raised from the center portion of the groove bottom continuously along the length thereof without being joined with the groove walls,
   wherein the angle of inclination of the groove walls of the main grooves positioned on both outsides of the main groove at the center area of the tire with respect to the normal line of the tangential line drawn on the tread surface at groove ends of the main groove is parallel to each other or is 5° or smaller in the direction to reduce the width of the grooves of the main grooves on the radially inside of the tire, and
   wherein the main groove positioned at the center area of the tire includes the raised area on one of the groove walls thereof and, on the other groove wall thereof, zigzag notches formed into a triangular pyramid shape, the notches being arranged circumferentially of the tire and the notches defining peaks and troughs extending from the tread surface to the groove bottom of the main groove.

2. The pneumatic tire according to claim 1, wherein the raised area includes a zigzag wall portion including repetitive peaks and troughs circumferentially of the tire.

3. The pneumatic tire according to claim 1, wherein peaks and troughs of the raised area are provided at regular intervals, the peaks and troughs of the notches formed into the triangular pyramid shape are provided at same intervals as the peaks and troughs of the raised area, and the peaks of the raised area and the troughs of the notches are positioned so as to oppose to each other with the intermediary of the main groove.

4. The pneumatic tire according to claim 1, wherein the height of the raised area is lower than the height of the ridge.

5. The pneumatic tire according to claim 1, comprising a number of short sipes opening in the tire width direction on at least one of the groove wall portions of the linear ribs, wherein the short sipes are arranged at intervals of 6 mm or smaller circumferentially of the tire.

* * * * *